United States Patent [19]
Pedrizetti

[11] Patent Number: 5,623,674
[45] Date of Patent: Apr. 22, 1997

[54] METHOD FOR DETERMINING STEERABLE INTERRUPT REQUEST LINES USED BY PCMCIA CONTROLLERS

[75] Inventor: Raymond D. Pedrizetti, Issaquah, Wash.

[73] Assignee: Microsoft Corporation, Redmond, Wash.

[21] Appl. No.: 437,285

[22] Filed: May 8, 1995

[51] Int. Cl.[6] .................................................. G06F 13/00
[52] U.S. Cl. ........................................... 395/733; 395/741
[58] Field of Search ..................................... 395/733, 741

[56] References Cited

U.S. PATENT DOCUMENTS

| | | | |
|---|---|---|---|
| 4,747,040 | 5/1988 | Blanset et al. | 364/200 |
| 5,436,621 | 7/1995 | Macko et al. | 340/825.44 |
| 5,436,856 | 7/1995 | Sauvage | 364/580 |
| 5,475,846 | 12/1995 | Moore | 395/733 |

Primary Examiner—Ayaz R. Sheikh
Assistant Examiner—John Travis
Attorney, Agent, or Firm—Jones & Askew

[57] ABSTRACT

A system for determining the connections between a PCMCIA controller and a programmable interrupt controller (PIC) by simulating an interrupt request from the PCMCIA controller and then evaluating the values contained in the interrupt request register of the PIC. An interrupt request association record is stored in response to receiving the simulated interrupt request at one of the interrupt request register inputs of the programmable interrupt controller. The interrupt request association record assigns the selected interrupt request line to the interrupt request register input that received the interrupt request signal. An interrupt request output from the PCMCIA controller is considered to be connected to a particular interrupt request register input of the PIC if a value in the interrupt request register of the PIC transitions from a logic low state to a logic high state, and then returns to the logic low state.

28 Claims, 6 Drawing Sheets

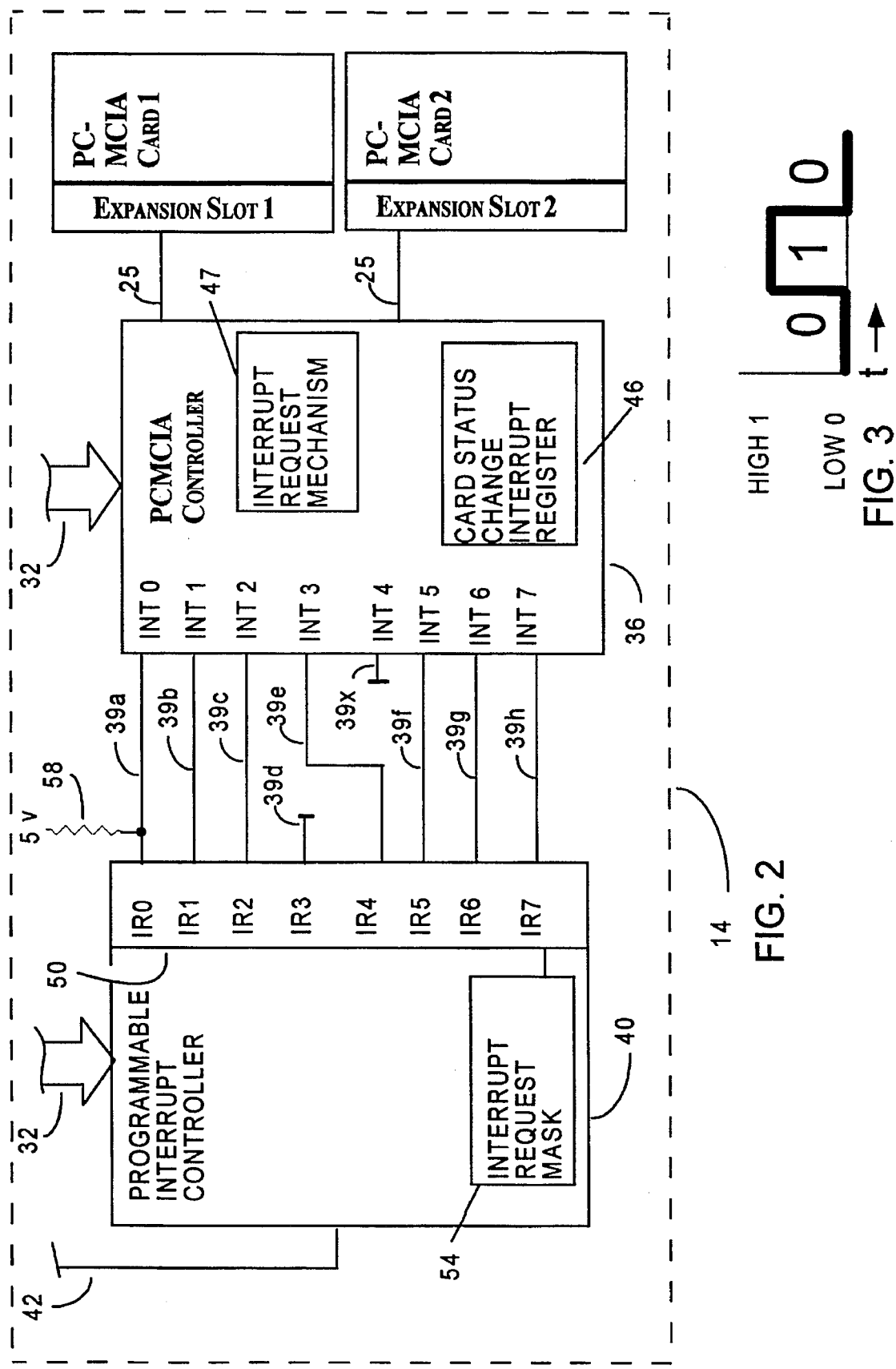

| TESTED INTERRUPT | BIT VECTORS = (IR0,IR1,IR2,IR3,IR4,IR5,IR6,IR7) | | | |
|---|---|---|---|---|
| | FIRST BIT VECTOR (STEP 510) | SECOND BIT VECTOR (STEP 526) | THIRD BIT VECTOR (STEP 536) | RESULTING BIT VECTOR (STEP 622) |
| INT0 | (0,0,0,0,0,0,0,0) | (1,0,0,0,0,0,0,0) | (0,0,0,0,0,0,0,0) | (1,0,0,0,0,0,0,0) |
| INT1 | (0,0,0,0,0,0,0,0) | (0,1,0,0,0,0,0,0) | (0,0,0,0,0,0,0,0) | (0,1,0,0,0,0,0,0) |
| INT2 | (0,0,0,0,0,0,0,0) | (0,0,1,0,0,0,0,0) | (0,0,0,0,0,0,0,0) | (0,0,1,0,0,0,0,0) |
| INT3 | (0,0,0,0,0,0,0,0) | (0,0,0,1,0,0,0,0) | (0,0,0,0,0,0,0,0) | (0,0,0,1,0,0,0,0) |
| INT4 | (0,0,0,0,0,0,0,0) | (0,0,0,0,0,0,0,0) | (0,0,0,0,0,0,0,0) | (0,0,0,0,0,0,0,0) |
| INT5 | (0,0,0,0,0,0,0,0) | (0,0,0,0,0,1,0,0) | (0,0,0,0,0,0,0,0) | (0,0,0,0,0,1,0,0) |
| INT6 | (0,0,0,0,0,0,0,0) | (0,0,0,0,0,0,1,0) | (0,0,0,0,0,0,0,0) | (0,0,0,0,0,0,1,0) |
| INT7 | (0,0,0,0,0,0,0,1) | (0,0,0,0,0,0,0,1) | (0,0,0,0,0,0,0,0) | (0,0,0,0,0,0,0,1) |

METHOD FOR DETERMINING STEERABLE INTERRUPT REQUEST LINES USED BY PCMCIA CONTROLLERS

FIELD OF THE INVENTION

The present invention relates generally to the field of interrupt-driven computer systems and more particularly to a method for automatically determining the connection of interrupt request lines from a PCMCIA controller to a programmable interrupt controller.

BACKGROUND OF THE INVENTION

Because the personal computer industry has many manufacturers of computers and computer components, the various manufacturers do not always produce parts that are designed identically. Although the components may meet certain basic industry design standards, subtle differences in design can cause certain computer programs running on the personal computer to induce errors or produce erroneous results during operation.

A particular problem identified in the computer industry occurs as a result of varying designs for Personal Computer Memory Card International Association (PCMCIA) controllers. Because a PCMCIA controller serves as a bus bridge between PCMCIA devices and the computer system, the PCMCIA controller connections and operations must be coordinated with the computer system. One of the functions of the PCMCIA controller is to steer an interrupt request of a PCMCIA device to an interrupt request input of a programmable interrupt controller (PIC). The PIC functions as a manager for the interrupt requests of various input\output devices, including PCMCIA devices, in a computer system. In response to an interrupt request, the PIC causes the central processing unit (CPU) of the computer system to stop executing its main program and to service the peripheral device which generated the interrupt request signal. The PIC accepts the request from a peripheral device and issues an interrupt signal to the CPU indicating which device generated the request.

With respect to steering interrupt requests, interrupt request outputs of PCMCIA controllers do not always have the interrupt request outputs directly connected to the same numerically aligned interrupt request inputs of the PIC. This problem may be termed a cross-connect problem. The cross-connect problem generally occurs because of the varying connection arrangements provided by different manufacturers of computer systems. Thus, when a computer program developer programs a PCMCIA device to generate an interrupt request, the input location of the interrupt request received at the PIC may not occur where expected and thereby cause errors during the operation of the program. Additionally, some manufacturers do not provide connections from all interrupt request outputs of the PCMCIA controller to the PIC. Thus, if a computer program developer designs an application to utilize an interrupt request line that is left unconnected, then a desired interrupt may not be generated if the unconnected line is programmed as the interrupt request signal path.

Prior solutions to the problem enable a user to, through the use of an installation program, define the interrupt request line connections based on connections known for the specific PCMCIA controller of a particular manufacturer. Some of the installations programs maintain a database of the many types of computer systems or devices and consult this database of known parameters in order to set up the appropriate interrupt assignments for the computer system.

These prior solutions are deficient for the following reasons. With an installation program, a user must interact with the computer system and provide data upon which the computer system performs its configuration operation. With user interaction required for proper set-up of the computer system, a user may through carelessness or through inexperience cause the incorrect device parameters to be configured for the computer system. Additionally, with a user interface program that prompts a user to enter the type of machine being utilized, storage space must be used to maintain a database of the appropriate connections for various computer system configurations. As new manufacturers produce systems utilizing PCMCIA controllers or as established manufacturers change the specifications for their PCMCIA controllers, the originally supplied database of system parameters will not be sufficient to meet the changed circumstances.

Thus, there is a need in the art for a system that can automatically determine the interrupt request signal paths between a PCMCIA controller and PIC for multiple computer systems.

SUMMARY OF THE INVENTION

Generally described, the present invention automatically determines the interrupt request signal paths between a PCMCIA controller and a PIC by simulating an interrupt request by the PCMCIA controller and then evaluating the contents of the interrupt request register of the PIC. After an interrupt request is simulated, an interrupt request output from the PCMCIA controller is considered to be connected to a particular input of the interrupt request register if a bit value in the interrupt request register of the PIC transitions from a logic low state to a logic high state and then returns subsequently to the logic low state.

More particularly, the present invention automatically determines the allocation of interrupt request signal connections between the PIC and the PCMCIA controller by simulating an interrupt request signal on a selected interrupt request line of the PCMCIA controller. An interrupt request line association record is stored if the simulated interrupt request signal is received at one of the interrupt request inputs of the PIC. The interrupt request line association record assigns the interrupt request line to the PIC interrupt request input that received the simulated interrupt request signal. If the simulated interrupt request signal is not received at the PIC, then the selected interrupt request line is not connected to the PIC.

Another feature of the present invention includes evaluating the states of bit values contained in the interrupt request register of the PIC to detect preselected state changes. Evaluation of the PIC bit values is performed by implementing Boolean or "logical" operations on the bit values. If the logical operations on the bit values indicate a change of state of a bit value at the interrupt request input of the PIC from a low-to-high-to-low state, then the interrupt request input of the PIC is determined to be connected to the selected interrupt request line that caused the transition.

To automatically determine the interrupt request connections between the PIC and PCMCIA controller, the present invention obtains first, second, and third bit vectors. The bit values in the interrupt request register of the PIC are read and saved as a first bit vector after the PCMCIA controller is programmed to control the desired interrupt lines. The values in the bit vector correspond to the ordered inputs of the interrupt request register. If the selected interrupt request line is connected to an interrupt request input of the PIC, then the programming of the PCMCIA controller interrupt request line will cause the interrupt request input to transition to a low state.

The present invention then provides a second signal to change the state of the interrupt request line, thereby releasing the selected interrupt request line from control by the PCMCIA controller. After the PCMCIA controller releases control of the selected interrupt request line, the bit values in the interrupt request register are read and saved as a second bit vector. If no other device is controlling the interrupt request line, the bit values of the interrupt request register input that was controlled and released will rise to a high state because a pull-up resistor maintains the input in a normally high state. This low-to-high transition simulates an interrupt to the PIC, causing the interrupt request register bit to be set. The present invention then re-programs the selected interrupt request line of the PCMCIA controller to control the interrupt line. If the selected interrupt request line is connected to an interrupt request input of the PIC, then the reprogramming of the interrupt line will cause the interrupt request input at the PIC to transition to a low state. After reprogramming the interrupt line, the bit values in the interrupt request register are read and saved as a third bit vector.

After the first, second, and third bit vectors are obtained, logical operations are performed on the bit vectors to determine if an interrupt request signal generated on a selected interrupt request line caused a low-to-high-to-low transition at an interrupt request input of the PIC. A logical exclusive "OR" operation is performed between the first bit vector and the second bit vector to determine if a low-to-high transition occurred at an input of the interrupt request register. A second logical exclusive "OR" operation is performed between the second bit vector and the third bit vector to determine if a high-to-low transition occurred at an input of the interrupt request register. These exclusive "OR" operations set a bit or provides a true or high value if the compared bits are different.

After the exclusive "OR" operations are performed, the resulting bit vectors are compared by conducting a logical "AND" operation. The logical "AND" comparison determines if a low-to-high transition and a high-to-low transition occurred on the same input of the interrupt request register. The logical "AND" operation sets a bit or provides a true value if the values being compared are true or represent a set state. Therefore, if both exclusive "OR" operations returned true values for the same input of the interrupt request register, then a low-to-high-to-low transition occurred at the set input. This particular transition indicates that the selected interrupt request line is connected to the set input of the PIC.

If the process determines that a low-to-high-to-low transition occurred, a record is stored which assigns the selected interrupt request line output of the PCMCIA controller to the interrupt request input of the PIC that exhibited the low-to-high-to-low transition. The PCMCIA controller is set with the correct value for the system interrupt request line using the request line association record when a card status change interrupt or PCMCIA device interrupt is being configured.

Thus, it is an object of the present invention to steer interrupt request signals to appropriate interrupt request inputs of a computer system.

It is a further object of the present invention to automatically determine the interrupt request connections between the PCMCIA controller and a PIC.

It is a further object of the present invention to automatically determine whether interrupt request connections are cross-connected between the PCMCIA controller and the PIC.

It is a further object of the present invention to automatically determine interrupt request outputs of the PCMCIA controller that are not connected to interrupt request inputs of the PIC.

It is a further object of the present invention to simulate interrupt request signals by the PCMCIA controller to determine the interrupt request connections of PCMCIA controller to the PIC.

It is a further object of the present invention to evaluate the interrupt request register of the PIC to determine the interrupt request connections between the PCMCIA controller and the PIC.

These and other objects, features, and advantages of the present invention will become apparent from reading the following description in conjunction with the accompanying drawings.

BRIEF DESCRIPTION OF THE DRAWINGS

FIG. 2 is an electrical schematic showing the components of the preferred embodiment of the present invention.

FIG. 3 shows the sequence of signals which indicates a detected interrupt request connection for the preferred embodiment of the present invention.

FIG. 7 is a table showing bit values evaluated in an example implementing the preferred embodiment of the present invention.

DETAILED DESCRIPTION OF THE PREFERRED EMBODIMENT

Referring to the figures, in which like numerals reference like parts throughout the several views, the preferred embodiment of the present invention is illustrated. As noted above, the present invention automatically determines the physical connections of Personal Computer Memory Card International Association (PCMCIA) controller interrupt request lines to a programmable interrupt controller (PIC). The interrupt signals connections between a PCMCIA controller and PIC are determined by simulating an interrupt request signal on a PCMCIA controller interrupt request line. The interrupt request register on the PIC is monitored to determine if an interrupt has been requested on the interrupt request line. By automatically determining the PCMCIA controller interrupt request connections, a user does not have to input configuration information directly in a system configuration file. This also allows a user to avoid running a configuration program in which equipment types must be specified. The present invention enables a user to simply power the computer system and thereafter have the PCMCIA controller properly pass interrupt requests from a PCMCIA device to the PIC without user intervention.

The processes, discussed below, of the preferred embodiment of the present invention are generally carried out in a sequence of steps. The steps generally require physical manipulations of physical quantities. Usually, though not necessarily, these quantities take the form of electrical or magnetic signals capable of being stored, transferred, combined, compared, or otherwise manipulated. It is convenient to refer to these signals as bits, values, elements, symbols, characters, terms, numbers, records, files or the like. It will be appreciated that all of these terms, as well as similar terms, are associated with appropriate physical quantities and are merely convenient labels applied to these quantities.

Figure 1:
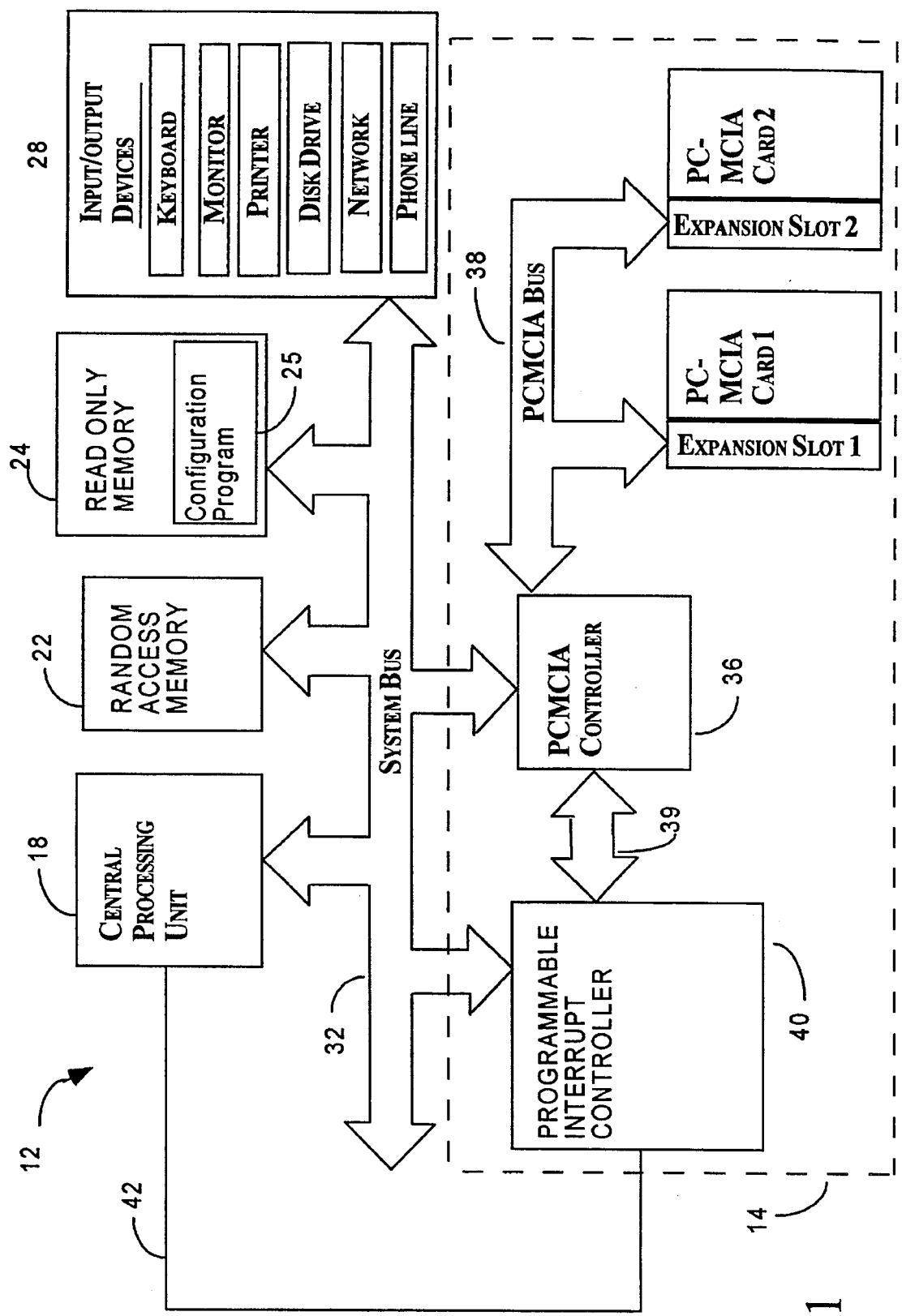
FIG. 1 is a block diagram showing the basic components of a computer system embodying the preferred embodiment of the present invention.

Referring to FIG. 1, the basic components of a computer system 12 embodying the preferred embodiment of the present invention are shown. In FIG. 1, a PCMCIA interrupt request control circuit 14 is connected to a central processing unit (CPU) 18; a random access memory (RAM) 22; a read-only memory (ROM) unit 24 containing a configuration program 25; and input\output (IXO) devices 28 through a system bus 32. The CPU 18 is typically implemented as a single-chip microprocessor, such as the models 80386 or 80486 that are available from Intel Corporation, Santa Clara, Calif. The CPU 18 operates in combination with computer software, such as an operating system and application programs, to control the operations of the computer system 12. The system bus 32 supports communications of control, address, and data signals between the CPU 18 and the remaining components of the computer system 12. The RAM 22 is a dynamic or volatile memory module used for temporal storage of data. The ROM unit 24 is useful for storing device-related information that supports the configuration of the devices within the computer system 12.

The PCMCIA interrupt request control circuit 14 controls the interactions of a PCMCIA card 1 and a PCMCIA card 2 with the components of the computer system 12. The PCMCIA cards 1 and 2 are electrically connected to the computer system 12 through an expansion slot 1 and an expansion slot 2, respectively. It should be appreciated by those skilled in the art that one or more PCMCIA cards and expansion slots may be provided in a general purpose computer system. However, only two expansions slots and cards are shown because further illustration of expansion slots and cards is not necessary for an understanding of the present invention.

Expansion slots 1 and 2 are connected to a PCMCIA controller 36 via a PCMCIA bus 38. A PIC 40 is connected to the PCMCIA controller 36 and provides control for interrupt requests generated by the PCMCIA cards 1 and 2. The PIC 40 has an interrupt line 42 connected to the CPU 18. The interrupt line 42 transmits electrical signals to the CPU 18 that indicate that a peripheral device is ready to transmit or receive data.

When the PCMCIA card 1 (or the PCMCIA card 2) requires servicing by the CPU 18, an interrupt request signal is transmitted to the PIC 40 via the PCMCIA controller 36. The PCMCIA controller 36 serves as a bus bridge for the PCMCIA cards 1 and 2 to the computer system 12. The PIC 40 functions as a manager for the interrupt requests of various input\output devices, including PCMCIA devices, in a computer system. In response to an interrupt request signal, the PIC 40 causes the CPU 18 to stop executing its main program and to service the peripheral device which generated the interrupt request signal. Specifically, the PIC 40 accepts the interrupt request from a peripheral device and issues an interrupt signal, indicating which device generated the request to the CPU 18.

The details of the PCMCIA interrupt control circuit 14 are illustrated in FIG. 2. Referring now to FIGS. 1 and 2, the expansion slots 1 and 2 have an interrupt request line 25 connected to the PCMCIA controller 36 to provide interrupt requests from the PCMCIA cards 1 and 2. The PCMCIA controller 36 has multiple interrupt request outputs, in this figure interrupt request outputs INT0 through INT7 are used as examples. It should be appreciated by those skilled in the art that more than eight interrupt request outputs may be provided on a PCMCIA controller 36. However, only eight interrupt request outputs are shown.

The PCMCIA controller 36 has a card status change interrupt register 46 that operates to generate an interrupt request signal when a designated interrupt request line of the PCMCIA controller 36 is programmed into the card status change interrupt register 46. The PCMCIA controller 36 may also have an internal interrupt request generating mechanism 47 which operates to generate an interrupt request signal on a selected interrupt request line when an appropriate control signal is provided from the CPU 18. The interrupt request outputs INT0 through INT7 may be connected to the inputs of the interrupt request register 50 of PIC 40 through connection lines 39. Residing in the interrupt request register 50 are individual inputs IR0 through IR7 which contain bit values of the interrupt levels that may be requested via interrupt outputs INT0 through INT7.

An interrupt mask register 54, which is connected to the interrupt request register 50, is an interrupt mask register 54 contains bits that correspond to the interrupt request inputs IR0 through IR7. The bits of the interrupt request mask register 54 serve to mask interrupt request signals received at the interrupt request register 50. The mask values of the interrupt request mask register 54 are binary values that are used to selectively screen out or let through certain bits of data values received at the interrupt request inputs IR0 through IR7. The masked bits serve to temporarily disable interrupt request received at designated inputs IR0 through IR7. This prevents the interrupt from being sent to the CPU 18 through interrupt line 42.

A pull-up resistor 58, which is connected to each of the interrupt request inputs, maintains the inputs IR0 through IR7 at a logic high voltage level when the interrupt request input lines are not being driven by the PCMCIA controller 36 or another device. It should be appreciated by those skilled in the art that each line 39 generally has a separate pull-up resistor but only one is shown for illustration purposes. As noted above, PCMCIA controllers 36, which are used by various computer system manufacturers, often do not have the interrupt request outputs, INT0 through INT7, designed to correspond directly to the same numerical interrupt request inputs IR0 through IR7 of the PIC 40. As a result, a programmer may program the PCMCIA controller to generate an interrupt request signal for a specific interrupt request output, such as output INT4, of the PCMCIA controller 36, which does not have an interrupt request line 39x connected to the PIC 40. Additionally, an interrupt request output, such as INT3, of the PCMCIA controller 36 may not be directly connected to the same corresponding numerical interrupt request input, IR3, of the interrupt request register 50. It will be appreciated that the interrupt request outputs INT0 through INT7 of the PCMCIA controller 36 can be assigned to varying interrupt request inputs IR0 through IR7. Accordingly, one implementation of a computer system using a PCMCIA controller may differ from a separate implementation of a computer system using the same or a compatible PCMCIA controller.

As noted above, prior art solutions have allowed a user to, through the use of an installation program, define the interrupt request connections based on interrupt request connections known for the specific PCMCIA controller 36 computer system installation for a particular manufacturer. Some of the installation programs maintain a database containing parameters for various types of machines or devices. The installation programs can consult this database of known parameters in order to set up the appropriate interrupt request assignments for the computer system. However, as manufacturers produce new installations of PCMCIA controllers 36 in a computer system, the originally supplied database of system parameters will not be sufficient for proper operation. The present invention provides an improvement over prior implementations by enabling automatic determination of the connection of interrupt request outputs of a PCMCIA controller 36 to the interrupt request inputs of a PIC 40.

As illustrated in FIG. 2, the interrupt request outputs INT0, INT1, INT2, INT3, INT6, and INT7 are directly connected to the same corresponding numerical interrupt request inputs IR0, IR1, IR2, IR5, IR6, and IR7, respectively as illustrated. However, as illustrated, the interrupt request output INT3 of the PCMCIA controller 36 is not directly connected to the corresponding interrupt request input IR3, but instead is connected to the interrupt request input IR4 of the PIC 40. Additionally, the interrupt output INT4 of the PCMCIA controller 36 is not connected to the PIC 40. When the configuration program 25 of the present invention encounters the PCMCIA controller 36 in the computer system 12, the configuration program 25 automatically determines the connections between the PCMCIA controller 36 and the PIC 40. This enables the automated determination of the interrupt request connections between a PIC 40 and a PCMCIA controller 36. These connections are preferably stored to a RAM memory structure of the computer system 12.

The computer system 12 conducts initialization and test functions, as well as device configuration functions, when the computer system 12 is first powered or "booted." Upon booting the computer system 12, one or more start-up programs begin to run to implement necessary initialization and test functions. These start-up programs may be implemented as stand-alone programs or are integrated to function within the framework of the operation system. The preferred embodiment is intended to operate without user intervention and serves to configure interrupt request signal paths for the PCMCIA controller 36. Accordingly, the preferred embodiment is implemented by an initial computer start-up program.

Start-up programs typically include a basic input/output system (BIOS) program and a power-on self-test (POST) program. The BIOS program supplies device-level control or support services for the primary input/output devices of the computer during the boot "initialization" process. Furthermore, after boot, the BIOS program accepts requests from application programs or the operating system running on the computer and performs input/output services as requested by those programs. The POST program conducts a sequence of tests for certain system-level devices and resources, including memory, to verify the proper operation of the computer components that are required to be active upon completion of the boot process. The programs associated with the computer control system are preferably stored in ROM located within the computer system 12, typically on the computer motherboard. The functions and operations of conventional BIOS and POST programs are well known and will not be further described herein.

In the preferred embodiment of the present invention, the computer system 12 preferably utilizes a dynamically loaded driver model to the evaluate connections of the PCMCIA controller 36. The driver initialize code tests for the appropriate connections during the start-up of the computer.

In view of the foregoing, the present invention automatically determines the interrupt request connections between the PCMCIA controller 36 and the PIC 40 by simulating an interrupt request by the PCMCIA controller 36 and reading the states of bit values contained in the interrupt request register 50. Turning now to FIGS. 2–3, when a transition from a logic low state, 0, to a logic high state, 1, is detected at IR0 through IR7, the corresponding bit value of the interrupt request register 50 is set, and when a transition from 1 to 0 is detected at IR0 through IR7, the corresponding bit value of the interrupt request register 50 is reset. An interrupt request output INT0 through INT7 from the PCMCIA controller 36 is considered to be connected to a particular interrupt request input, e.g., IR0, of the PIC 40 if the bit value at the IR0 input transitions from a logic low state, 0, to a logic high state, 1, and then returns to the logic low state, 0, as shown in FIG. 3.

The transitions evaluated by the preferred embodiment of the present invention make use of the computer industry standard of providing a logic high voltage signal to the interrupt request inputs IR0 through IR7 as the normal state of the interrupt request connection lines 39. A pull-up resistor 58, which is preferably connected to a +5 volts power source, provides the logic high voltage state. The pull-up resistor 58 may be connected internally on the PIC 40 or external to the PIC 40 on the system bus 32. When a device is not controlling an interrupt request connection line as part of the PIC 40, the pull-up resistor 58 holds the interrupt request connection line at 5 volts, thereby providing a logic high state on the line.

When an interrupt request output of the PCMCIA controller 36 is connected to an interrupt request input of interrupt request register 50, programming the PCMCIA controllers cards status change register to a specific interrupt will pull the connected interrupt request input to a logic low state.

Figure 4:
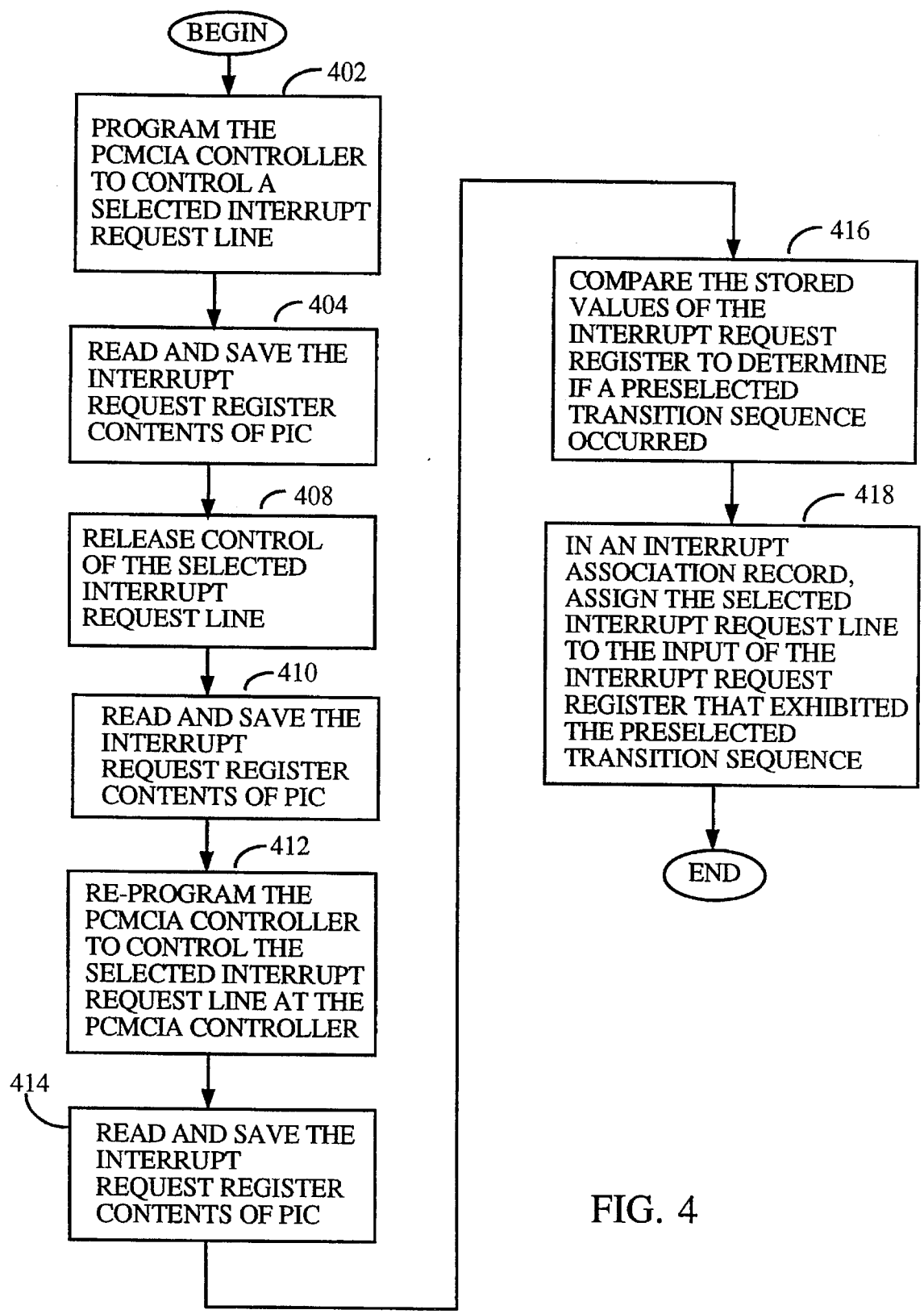
FIG. 4 is a flow diagram showing the general steps implemented in the preferred embodiment of the present invention.

Referring to FIG. 4, the general steps of the process of the preferred embodiment of the present invention are shown. FIG. 4 will be discussed in conjunction with FIGS. 2 and 3. The preferred embodiment imposes a logic low state, at step 402, on a selected interrupt request output, e.g., INT0, for which testing is desired, then releases the logic low state of the interrupt request output INT0 by resetting, at step 408, the interrupt request output INT0 to an unused state. The process reads and saves the contents of the interrupt request register 50 at steps 404 and 410, respectively. If the PCMCIA controller 36 is connected to the PIC 40 by an interrupt request connection line 39, the release of the interrupt request output of the PCMCIA controller 36 will allow the pull-up resistor 58 to cause the connection line 39 to transition to the high state. This low-to-high transition simulates an interrupt to the PIC 40 which causes a bit in the interrupt request register 50 to be set.

Next, the previously selected interrupt request output INT0 is programmed, at step 412, in the PCMCIA controller 36, thereby pulling the interrupt connection line to a logic low state at the PIC 40. Again, the contents of the interrupt request register 50 are read and saved at step 414. For this example, if the connection line 39a is connected between the PIC 40 and the PCMCIA controller 36, a low-to-high-to-low transition is detected at the interrupt request register 50. However, if another device is controlling the connection line 39a to the PIC 40, then the connection line 39a will remain in a logic low state and thus no transition to the high state will occur. Additionally, if a device, including the PCMCIA controller 36, is not controlling a particular input of the interrupt request register 50, the state of the connection lines 39 will remain in a logic high state and the bits of the interrupt request register 50 will remain in a normally low state.

The operation of detecting the transitions imposed by the PCMCIA controller 36 on the interrupt request connection lines is accomplished by reading, saving, and then evaluating the bit values which are stored as bit vectors, for each input IR0 through IR7 after each of the imposed programming steps. To detect a low-to-high-to-low transition occurring at the PIC 40, the preferred embodiment compares the stored bit values at step 416 by implementing two logic exclusive "OR" operations on bit values saved after the steps of controlling and releasing the interrupt request line, and thereafter re-controlling the interrupt request line. The logic exclusive "OR" logical operation is true or provides a set value if the two evaluated states are different.

The first logic exclusive "OR" operation is performed in step 416 between the bit values saved after controlling an interrupt request connection line by the PCMCIA controller 36 and the bit values saved after releasing control of the interrupt request connection line. In this case, a transition from a logic low state to a logic high state of a bit value as detected at the interrupt request register 50 will provide a set condition in the resulting bit vector of the exclusive "OR" operation.

The second logic exclusive "OR" operation is performed in step 416 between the bit values saved after releasing control of the interrupt request line and the bit o values saved after re-controlling the interrupt on the selected interrupt request connection line 39. At this point, the preferred embodiment checks for a transition from high to low. If a bit value is different between the resetting of the selected interrupt request line and the reprogramming or re- controlling the interrupt on the selected interrupt request line, then a bit is set in the resulting bit vector which indicates that a transition occurred from logic high state to logic low state.

As noted above, because the preferred embodiment looks for a transition from low to high to low, the results of the two exclusive "OR" operations are logic "AND'd" together in step 416. This logical operation provides a set value only if the two exclusive "OR" operations resulted in a set condition on the same input of the interrupt request register 50. If the results of both exclusive "OR" operations are logic high values for an interrupt request input of the interrupt request register 50, then a low-to-high-to-low transition occurred, indicating that the interrupt request input is connected to a selected interrupt request line. The selected interrupt request line is assigned, at step 418, to the interrupt request input of the interrupt request register 50 that exhibited the low-to-high-to-low transition.

Figure 5:
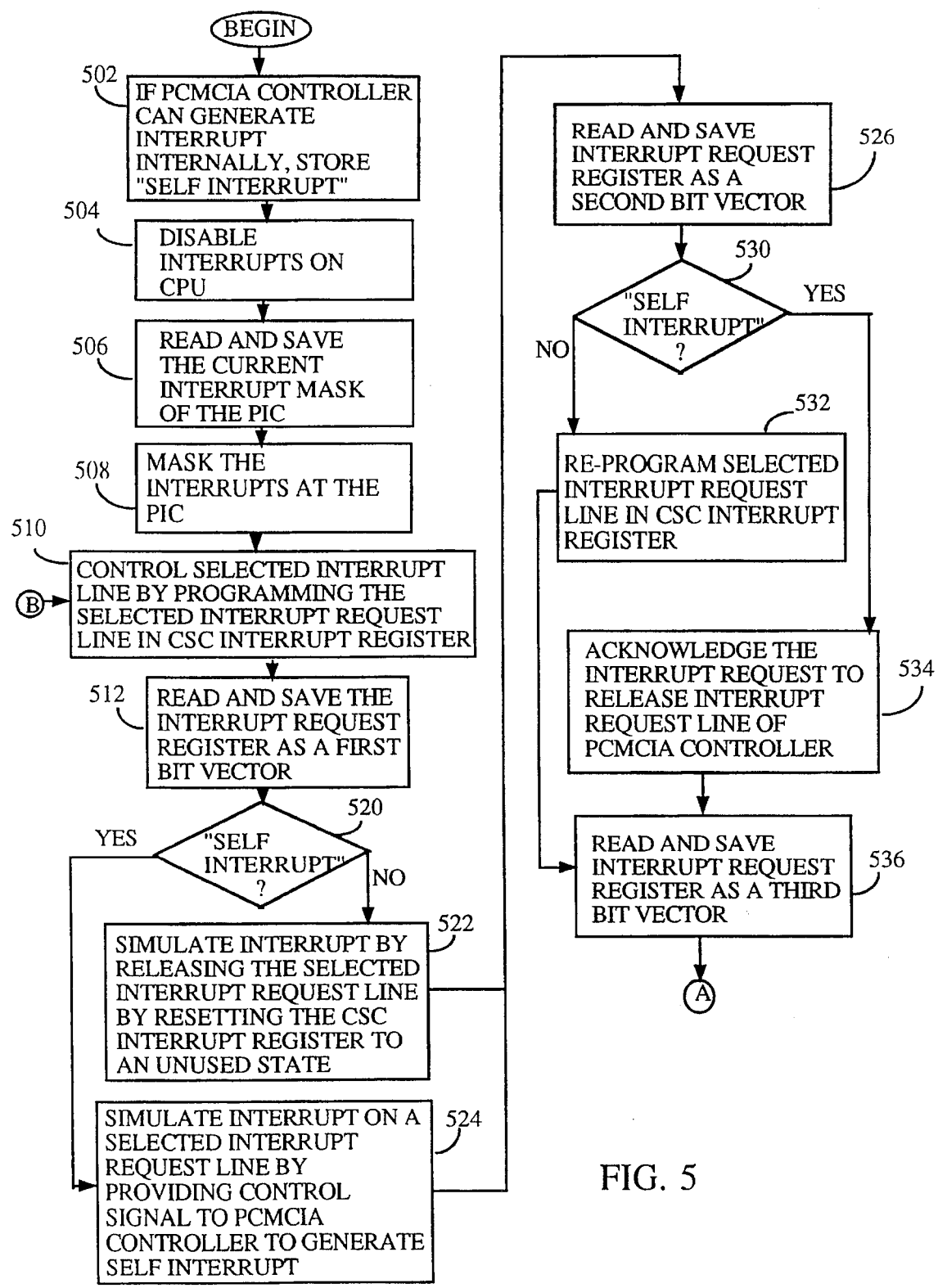
FIGS. 5 and 6 are flow diagrams showing the steps implemented in the preferred embodiment of the present invention.
Figure 6:
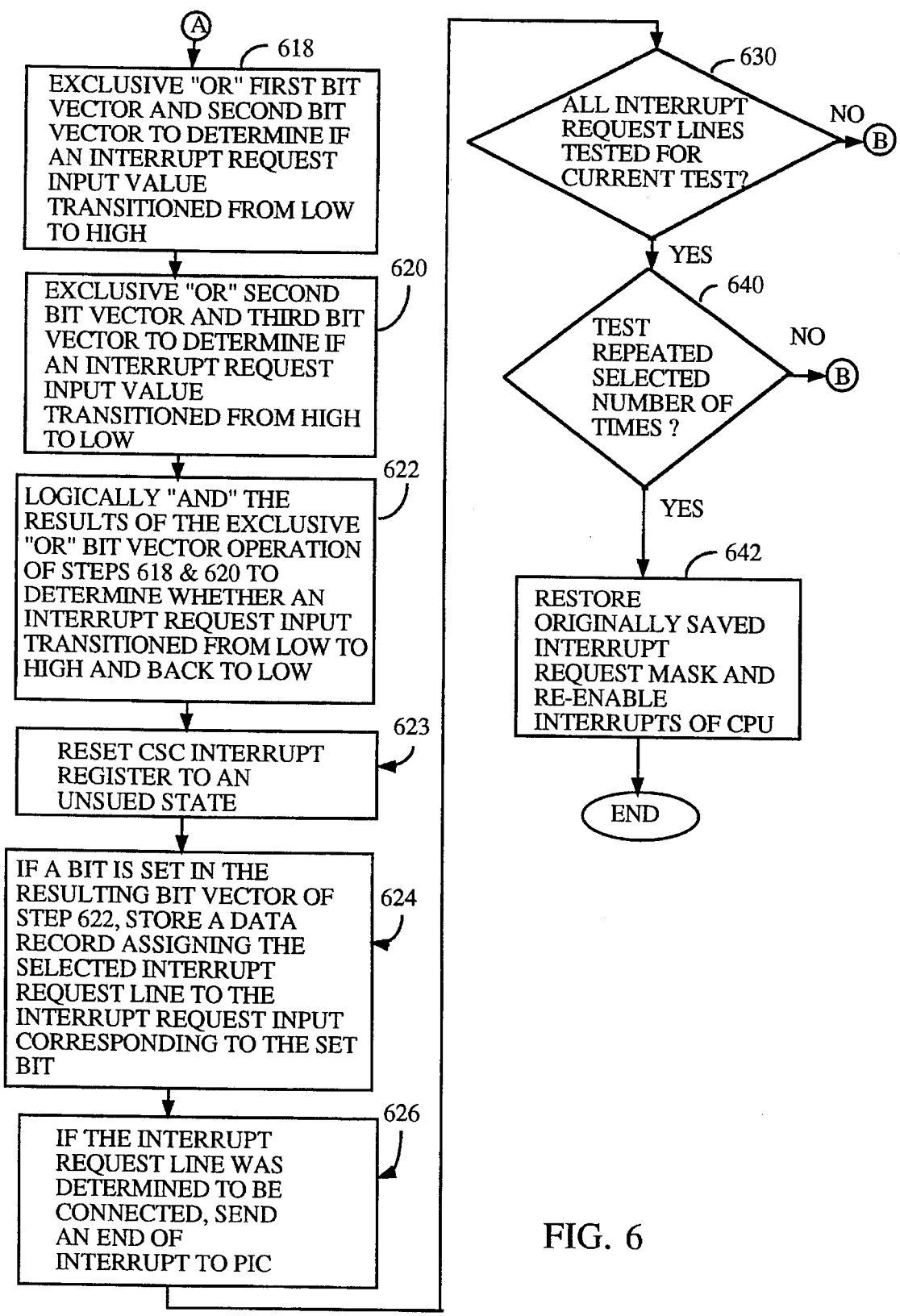

The specific steps implemented in the preferred embodiment of the present invention are discussed in connection with FIGS. 5 and 6. The steps preferably are implemented as computer-implemented routine in a start-up program module. This program may reside in ROM 25. Referring to FIG. 5, the preferred steps for simulating an interrupt request to determine the interrupt request line connections between the PCMCIA controller 36 and the PIC 40 are illustrated. The steps of the process will be discussed also in conjunction with FIGS. 1 and 2. Referring now to FIGS. 1, 2, and 5, the first step, 502, of the process reads a PCMCIA controller 36 identification number to determine whether the PCMCIA controller 36 may have an interrupt request mechanism 47 that enables the PCMCIA controller 36 to generate its own interrupts. As known to those skilled in the art, some models of PCMCIA controllers contain internal mechanisms for generating interrupt request signals. If the PCMCIA controller 36 includes an internal mechanism that 47 enables it to generate its own interrupts, a parameter is stored in RAM 18 for subsequent use.

The following steps 504, 506, and 508 are the initial steps taken in the process which prevent the simulated interrupt requests from actually generating interrupts that interrupt the CPU 18 during testing. These steps also preserve the state of the PIC 40 before starting the testing of the interrupt request outputs INT0 through INT7. At step 504, the interrupts on the CPU 18 are disabled so that the simulated interrupt requests generated during the testing of the interrupt request connections between PCMCIA controller 36 and the PIC 40 do not interrupt processing at the CPU 18. The current interrupt mask of the PIC 40 is read and saved at step 506 and the interrupt inputs 39 at the PIC 40 are masked at step 508.

After the steps 504, 506, and 508 are taken to preserve the initial state of the CPU 18 and PIC 40, the process proceeds to step 510. At step 510, control is gained of the interrupt request line to be tested by programming the selected interrupt request line in the Card Status Change (CSC) interrupt register 46. At step 512, the contents of the interrupt request register 50 are read and saved as a first bit vector. This enables the contents of the interrupt request register 50, saved after the interrupt signal simulation, to be evaluated later in the process.

In step 520, the process determines whether the PCMCIA controller 36 has a internal interrupt request mechanism 47 as determined at step 502. If so, then the process proceeds via the "yes" branch to step 524 where an interrupt request signal is simulated on a selected interrupt request line. This simulation is conducted by providing a control signal to the PCMCIA controller 36 to generate its own interrupt by the mechanism 47. However, if at step 520, the PCMCIA controller 36 does not have its own interrupt request generating capability, then the process proceeds via the "no" branch to step 522. In step 522, an interrupt is simulated by releasing the selected interrupt request line. The selected interrupt request line is released by resetting CSC interrupt register 46 to an unused state. At this point, if no other device is connected to the interrupt request register 50, the pull-up resister 58 will cause certain bits of the interrupt request register 50 to rise to a logic high state or remain at a logic high state.

After the simulation of an interrupt request signal from either step 522 or 524, the process proceeds to step 526 where the value of the interrupt request register 50 is read and saved as a second bit vector. This enables the contents of the interrupt request register 50, saved after the interrupt request signal simulation, to be evaluated later in the process. At step 530, the stored "self interrupt" parameter is once again evaluated to determine the method of generating an appropriate control signal for the selected interrupt request line. If the PCMCIA controller 36 includes an internal interrupt request mechanism 47, then the process proceeds via the "yes" branch to step 534. The interrupt request is acknowledged in step 534 by the PCMCIA controller 36, thereby releasing control of the selected interrupt request line. However, if at step 530, the PCMCIA controller 36 does not have its own interrupt request generating capability, then the process proceeds to step 532 via the "no" branch. At step 532, the selected interrupt request line number is re-programmed in the CSC interrupt register 46 to gain control of the selected interrupt request line by the PCMCIA controller 36.

After changing the state of the interrupt request line of the PCMCIA controller 36 at either step 532 or step 534, the process proceeds to step 536 where the value of the interrupt request register 50 is read and saved as a third bit vector. This enables the contents of the interrupt request register 50, saved after the releasing of the interrupt request line, to be evaluated later in the process. At this point in the process, if a particular interrupt request input of the interrupt request register 50 remains high, then the selected interrupt request line is not connected to this particular input of the PIC 40. The process then proceeds from step 536 of FIG. 5 to node A of FIG. 6.

The evaluation of the saved bit vectors begins at step 618 and continues through step 624. At step 618, a logical exclusive "OR" operation is performed between the first bit vector and second bit vector, yielding a final resulting bit vector, to determine which interrupt request inputs IR0 through IR7 transitioned from low to high. In step 620, a second logical exclusive "OR" operation is performed with respect to the second bit vector and third bit vector, yielding a second resulting bit vector, to determine which interrupt request inputs IR0 through IR7 transitioned from high to low. To determine if a particular interrupt request line transitioned from low to high and back to low, at step 622, the first and second resulting bit vectors of steps 618 and 620 are logically "AND'd" together, yielding a final resulting bit vector, to determine whether the selected interrupt request line caused a transition from low to high to low in the interrupt request register 50. At step 623, the CSC interrupt register 46 is set to an unused state. At step 624, if a bit is set in the final resulting bit vector from step 622, the computer system 12 stores a data record that assigns the selected interrupt request line to the interrupt request input corresponding to the set bit. At step 626, if the interrupt request line is connected, as indicated by a set bit in the final resulting bit vector from sequence of logical operations, the computer system 12 enables the specific interrupt and the interrupt handler sends an "end of interrupt" signal to the PIC 40. The process then proceeds to step 630.

At step 630, a determination is made as to whether each of the interrupt request output, INT0 through INT7, of the PCMCIA controller 36 has been tested. If each of the interrupt request lines, INT0 through INT7, has not been tested, then the process proceeds via the "NO" branch of step 630 to the node B of FIG. 5. The steps discussed above are then repeated for selecting and testing the remaining untested interrupt request lines of the PCMCIA controller 36. If, at step 630, all interrupt request output 15, INT0 through INT7, have been tested, then the "YES" branch is followed to step 540. At step 640, a determination is made as to whether a preselected number of tests have been performed on each interrupt request output INT0 through INT7. Step 640 provides a measure of assurance that the results obtained are valid by enabling the process to determine if the same results are produced during a successive test. If, at step 640, all interrupt request lines have not been tested for a preselected number of times, then the process proceeds to node B of FIG. 5 where reverification tests may be performed on the interrupt request outputs INT0 through INT7.

At step 642, the computer system restores the originally saved interrupt mask and re-enables the interrupts of the CPU 18. The computer system 12 sets the PCMCIA controller 36 with the correct value for the desired system interrupt request when a card status change or PCMCIA card interrupt request occurs.

FIG. 7 presents a table 700 listing the bit vectors obtained as a result of saving the contents of interrupt request register 50, as discussed above in connection with the process of FIGS. 5 and 6 and as applied to the connections between the PIC 40 and PCMCIA controller 36 shown in FIG. 2. The bit vectors shown in table 700 represent the ordered bit values of the interrupt request register as follows: (IR0, IR1, IR2, IR3, IR4, IR5, IR6, IR7). The following discussion of the values in table 700 is given with reference to FIGS. 2, 5, 6, and 7. The following discussion only addresses certain entries in table 700. However, one skilled in the art can readily derive the non-discussed values in light of the above and following discussion.

Row one of table 700 shows the result of the evaluation of the bit vectors obtained from the steps of the processes of the preferred embodiment of the present invention as applied to the interrupt request output INT0 of the PCMCIA controller 36. With respect to the processing of interrupt request output 1NT0, the first bit vector (0,0,0,0,0,0,0,0), as saved at step 512 of FIG. 5, indicates that the interrupt request input IR0 was pulled low or was already low. The second bit vector (1,0,0,0,0,0,0,0), as saved at step 526 of FIG. 5, indicates that when the interrupt request output INT0 line was released by resetting the simulated interrupt input that IR0 transitioned to a high state. The third bit vector (0,0,0,0,0,0,0,0), as saved at step 536, indicates that when the interrupt request signal was re-programmed, IR0 transitioned to a low state again.

The saved bit vectors are operated on as follows. The final resulting bit vector is obtained by:

(1) performing a logical exclusive "OR" operation between the first bit vector (0,0,0,0,0,0,0,0), and second bit vector (1,0,0,0,0,0,0,0), to yield the first exclusive "OR" operation bit vector (1,0,0,0,0,0,0,0) for detecting a low-to-high transition;

(2) performing a logical exclusive "OR" operation between the second bit vector (1,0,0,0,0,0,0,0), and the third bit vector (0,0,0,0,0,0,0,0), to yield the second exclusive "OR" operation bit vector (1,0,0,0,0,0,0,0) for detecting a high-to-low transition; and (3) performing a logical "AND" between the first exclusive "OR" operation bit vector (1,0,0,0,0,0,0,0) and the second exclusive "OR" bit vector (1,0,0,0,0,0,0,0) to obtain, at step 622, the "AND" operation resulting bit vector (1,0,0,0,0,0,0,0) for detecting a low-to-high-to-low transition. If a bit is set in the "AND" operation resulting bit vector, the interrupt request input IR0 through IR7 that corresponds to the set bit is assigned to the selected interrupt request output of the PCMCIA controller 36. In this example, INT0 is assigned to IR0. As shown in FIG. 2, interrupt request output INT0 is connected to IR0.

With continuing reference to table 700, row four of the table shows the result of the evaluation of the bit vectors obtained from the steps of the processes of the preferred embodiment of the present invention as applied to the interrupt request output INT3 of the PCMCIA controller 36. As illustrated interrupt request output INT3 is not connected to the same numerical request line of the PIC 40. The processing of interrupt request output INT3 is as follows. The first bit vector (0,0,0,0,0,0,0,0), as saved at step 512 of FIG. 5, indicates that the interrupt request input IR4 was pulled low or was already low. The second bit vector (0,0,0,1,0,0,0), as saved at step 526 of FIG. 5, indicates that when the interrupt request output INT3 line was released by resetting the interrupt request input that IR0 transitioned to a high state. The third bit vector (0,0,0,0,0,0,0,0), as saved at step 536, indicates that when the interrupt request signal was reprogrammed that the IR4 transitioned to a low state again.

The saved bit vectors are operated on as elbows. The "AND" operation bit vector is obtained by:

(1) performing a logical exclusive "OR" operation between the first bit vector (0,0,0,0,0,0,0,0), and second bit vector (0,0,0,0,1,0,0,0), to yield the first exclusive "OR" operation bit vector (0,0,0,0,1,0,0,0) for detecting a low-to-high transition;

(2) performing a logical exclusive "OR" operation between the second bit vector (0,0,0,0,1,0,0,0), and the third bit vector (0,0,0,0,0,0,0,0), to yield the second exclusive "OR" operation bit vector (0,0,0,0,1,0,0,0) for detecting a high-to-low transition; and (3) performing a logical "AND" between the first exclusive "OR" operation bit vector (0,0,0,0,1,0,0,0) and the second exclusive "OR" operation bit vector (0,0,0,0,1,0,0,0) to obtain, at step 622, the "AND" operation resulting bit vector (0,0,0,0,1,0,0,0) for detecting a low to high to low transition. The set bit in the "AND" operation bit vector indicates that the fifth input, IR4, transitioned from low to high to low when the interrupt request output INT 3 was selected and tested. Thus, in this example, interrupt request output INT3 is assigned to IR4 which corresponds to the set bit. This example shows how the present invention automatically determines PCMCIA controller interrupt request output connections that are cross-connected.

With continuing reference to table 700, row five of the table 700 shows the result of the evaluation of the bit vectors obtained from the steps of the processes of the preferred embodiment of the present invention as applied to the interrupt request output INT4 of the PCMCIA controller 36. As illustrated interrupt request output INT4 is not connected to the PIC 40. The processing of interrupt request output INT4 is as follows. The first bit vector (0,0,0,0,0,0,0,0), as saved at step 512 of FIG. 5, indicates that when the interrupt request line was programmed on interrupt request output INT4 that none of the interrupt request lines of the PIC 40 was pulled low. The second bit vector (0,0,0,0,0,0,0,0), as saved at step 526 of FIG. 5, indicates that when the interrupt request output INT3 line was released by reprogramming the interrupt request input to an unused state that the inputs of interrupt request register remained at the high state. The third bit vector (0,0,0,0,0,0,0,0), as saved at step 536, indicates that when the interrupt signal was reprogrammed that none of the interrupt request inputs transitioned to a low state.

The saved bit vectors are operated on as follows. The "AND" operation resulting bit vector is obtained by:

(1) performing a logical exclusive "OR" operation between the first bit vector (0,0,0,0,0,0,0,0), and second bit vector (0,0,0,0,0,0,0,0), to yield the first exclusive "OR" operation bit vector (0,0,0,0,0,0,0,0) for detecting a low-to-high transition;

(2) performing a logical exclusive "OR" operation between the second bit vector (0,0,0,0,0,0,0,0), and the third bit vector (0,0,0,0,0,0,0,0), to yield the second exclusive "OR" operation bit vector (0,0,0,0,0,0,0,0) for detecting a high-to-low transition; and (3) performing a logical "AND" between the first exclusive "OR" operation bit vector (0,0,0,0,0,0,0,0) and the second exclusive "OR" operation bit vector (0,0,0,0,0,0,0,0) to obtain, at step 622, the third "AND" operation bit vector (0,0,0,0,0,0,0,0) for detecting a low-to-high-to-low transition. Because no bit is set in the resulting bit vector, the processes of the present invention has determined that the interrupt request output INT4 of the PCMCIA controller 36 is not connected to any input of the interrupt request register 50 of the PiC 40. Thus, in this example, interrupt request output INT4 is not assigned to any interrupt request register 50 input. This example shows how the present invention automatically determines that a PCMCIA controller interrupt request line is not connected to the PIC 40.

In summary, the preferred embodiment of the present invention automatically determines the allocation of interrupt request signal connections between the PIC and the PCMCIA controller by simulating an interrupt request signal on a selected interrupt request line of the PCMCIA controller. An interrupt request line association record is stored if the simulated interrupt request signal is received at one of the interrupt request inputs of the PIC. The interrupt request line association record assigns the interrupt request line to the PIC interrupt request input that received the simulated interrupt request signal. If the simulated interrupt request signal is not received at the PIC, then the selected interrupt request line is not connected to the PIC.

The foregoing relates to the preferred embodiment of the present invention, and many changes may be made therein without departing from the scope of the invention as defined by the following claims.

I claim:

1. In a general purpose computer system characterized by computer resources including a central processing unit, a memory, a programmable interrupt controller (PIC) having an interrupt request register, said interrupt request register having a plurality of ordered interrupt request inputs and having values corresponding to each of said interrupt request inputs, and a PCMCIA controller having a plurality of interrupt request lines, each of said resources connected via a computer system bus, a computer-implemented method for determining the allocation of interrupt request connections between said programmable interrupt controller and said PCMCIA controller, comprising the steps of:

simulating an interrupt request signal on a selected interrupt request line of said PCMCIA controller to provide a known state on said selected interrupt request line; and in response to said simulating step, evaluating said values of said interrupt request register to determine the allocation of interrupt request connections between said PIC and said PCMCIA controller.

2. The method of claim 1 further comprising the step of storing an interrupt request association record in said memory in response to receiving said interrupt request signal, as determined by said evaluating step, at one of said plurality of interrupt request inputs of said programmable interrupt controller, said interrupt request association record assigning said selected interrupt request line to said one of said plurality of interrupt request inputs.

3. The method of claim 1 wherein said evaluating step comprises detecting whether said values of said interrupt request register have changed to preselected states.

4. The method of claim 3 wherein said detecting step comprises performing Boolean operations on said values to detect said preselected states.

5. The method of claim 4 wherein preselected state changes comprise the transition of a logic low state to a logic high state, and a return to said logic low state for an interrupt request input.

6. In a general purpose computer system characterized by computer resources including a central processing unit, a memory unit, a programmable interrupt controller (PIC) having an interrupt request register, said interrupt request register having a plurality of ordered interrupt request inputs and having values corresponding to each of said interrupt request inputs, and a PCMCIA controller having a plurality of interrupt request lines, each of said resources connected via a computer system bus, a computer-implemented method of determining the allocation of interrupt request connections between said programmable interrupt controller and said PCMCIA controller, comprising the steps of:

(a) gaining control of a selected interrupt request line to provide a predetermined signal;

(b) in response to gaining control of said interrupt request line, reading and saving the values of the interrupt request register as a first bit vector;

(c) providing a signal to simulate an interrupt request on said selected interrupt request line;

(d) in response to providing a signal to simulate an interrupt request on said selected interrupt request line, reading and saving the values of the interrupt request register as a second bit vector;

(e) releasing control of said selected interrupt request line;

(f) in response to releasing control of said selected interrupt request line, reading and saving the values of the interrupt request register as a third bit vector; and (g) evaluating said bit vectors to determine the allocation of interrupt request connections between said PIC and said PCMCIA controller.

7. The method of claim 6 wherein said step of evaluating further comprises the steps of:

(h) performing a logical exclusive "OR" operation between said first bit vector and said second bit vector, thereby yielding a first resulting bit vector;

(i) performing a logical exclusive "OR" operation between said second bit vector and said third bit vector, thereby yielding a second resulting bit vector; and (j) performing a logical "AND" operation between said first resulting bit vector and said second resulting bit vector, thereby yielding a third resulting bit vector.

8. The method of claim 7 wherein said step of evaluating further comprises the step of (k) evaluating said third resulting bit vector to determine if said selected interrupt request line is connected to said PIC.

9. The method of claim 8 wherein said evaluating step comprises detecting whether said bit values corresponding to each of said interrupt request inputs have changed to preselected states.

10. The method of claim 9 wherein said detecting step comprises performing Boolean operations on said bit values to detect said preselected states.

11. The method of claim 10 wherein preselected state changes comprise the transition of a logic low state to a logic high state, and a return to said logic low state for an interrupt request input.

12. The method of claim 11 further comprising the step of storing an interrupt request association record in said memory in response to receiving said interrupt request signal, as determined by said evaluating step, at one of said plurality of interrupt request inputs of said programmable interrupt controller, said interrupt request association record assigning said selected interrupt request line to said one of said plurality of interrupt request inputs.

13. The method of claim 12 wherein said step of storing said interrupt request association record comprises:

(l) determining if a bit value is set in said third resulting bit vector; and (m) assigning said selected interrupt request line to said one of said plurality of interrupt request inputs of said PIC, if a value is set in said third resulting bit vector, wherein said one of said plurality of interrupt request inputs corresponds to the set bit.

14. The method of claim 13 comprising repeating steps (a) through (m) until each of said steps (a) through (m) have been performed on each interrupt request line of said PCMCIA controller.

15. The method of claim 14 further comprising the steps of:

prior to said simulating step:

(n) disabling interrupts on said central processing unit;

(o) reading and storing the interrupt mask of said PIC; and (p) masking the interrupt outputs of said PIC.

16. The method of claim 14 further comprising the steps of:

determining whether said PCMCIA controller has an internal mechanism for generating interrupt request; and simulating said interrupt request signal using said internal mechanism if said PCMCIA controller has said internal mechanism.

17. The method of claim 1 further comprising the steps of:

determining whether said PCMCIA controller has an internal mechanism for generating interrupt request; and simulating said interrupt request signal using said internal mechanism if said PCMCIA controller has said internal mechanism.

18. In a general purpose computer system characterized by computer resources including a central processing unit, a memory unit, a programmable interrupt controller having an interrupt request register, said interrupt request register having a plurality of ordered interrupt request inputs and having bit values corresponding to each of said interrupt request inputs, and a PCMCIA controller having a plurality of interrupt request outputs, each of said resources connected via a computer system bus, a computer-implemented method of automatically determining the allocation of interrupt request connections between a programmable interrupt controller and a PCMCIA controller, comprising the steps of:

simulating interrupt request signals on each interrupt request output of said PCMCIA controller; and evaluating said interrupt request register inputs of said programmable interrupt controller to determine if preselected signal transitions occur at said interrupt request register inputs in response to said simulating step, said preselected transitions indicating which of said interrupt request inputs are connected to selected ones of said interrupt request outputs.

19. The method of claim 18 further comprising the step of:

determining whether said PCMCIA controller has an internal mechanism for generating interrupt request: and simulating said interrupt request signal using said internal mechanism if said PCMCIA controller has said internal mechanism.

20. The method of claim 19 wherein said step of evaluating further comprises performing Boolean operations on said bit values at said interrupt request inputs to detect if preselected state changes of said bit values occur.

21. The method of claim 20 wherein said step of evaluating to determine if preselected state changes of said bit value occur comprises detecting bit state changes from low voltage to high voltage to low voltage.

22. A computer-readable medium on which is stored a program module for determining the allocation of interrupt request connections between a programmable interrupt controller and a PCMCIA controller of a computer system, comprising instructions which, when executed by said computer system, perform the steps of:

(a) gaining control of a selected interrupt request line to provide a predetermined signal;

(b) in response to gaining control of said interrupt request line, reading and saving values stored in an interrupt request register of said computer system as a first bit vector, said interrupt request register having a plurality of ordered interrupt request inputs and said values corresponding to each of said interrupt request inputs;

(c) providing a signal to simulate an interrupt request on said selected interrupt request line;

(d) in response to providing a signal to simulate an interrupt request on said selected interrupt request line, reading and saving the values of the interrupt request register as a second bit vector;

(e) releasing control of said selected interrupt request line;

(f) in response to releasing control of said selected interrupt request line, reading and saving the values of the interrupt request register as a third bit vector; and (g) evaluating said bit vectors to determine the allocation of interrupt request connections between said programmable interrupt controller and said PCMCIA controller.

23. The computer-readable medium of claim 22 further comprising instructions which, when executed by said computer system, perform the steps of:

(h) performing a logical exclusive "OR" operation between said first bit vector and said second bit vector, thereby yielding a first resulting bit vector;

(i) performing a logical exclusive "OR" operation between said second bit vector and said third bit vector, thereby yielding a second resulting bit vector; and (j) performing a logical "AND" operation between said first resulting bit vector and said second resulting bit vector, thereby yielding a third resulting bit vector.

24. The computer-readable medium of claim 23 wherein said step of evaluating further comprises the step of (k) evaluating said third resulting bit vector to determine if said selected interrupt request line is connected to said programmable interrupt controller.

25. The computer-readable medium of claim 24 wherein said evaluating step comprises detecting whether said bit values corresponding to each of said interrupt request inputs have changed to preselected states.

26. The computer-readable medium of claim 25 wherein said detecting step comprises performing Boolean operations on said bit values to detect said preselected states.

27. The computer-readable medium of claim 26 wherein said preselected states comprise the transition from a logic low state to a logic high state, and a return to said logic low state for an interrupt request input.

28. A computer-readable medium on which is stored a program module for determining the allocation of interrupt request connections between a programmable interrupt controller and a PCMCIA controller of a computer system, comprising instructions which, when executed by said computer system, perform the steps of:

simulating interrupt request signals on each interrupt request output of said PCMCIA controller; and evaluating interrupt request register inputs of said programmable interrupt controller to determine if preselected signal transitions occur at said interrupt request register inputs in response to said simulating step, said preselected transitions indicating which of said interrupt request inputs are connected to selected ones of said interrupt request outputs.

* * * * *